Nov. 24, 1925.
F. H. BEYEA
1,562,678
TIRE BEAD CONSTRUCTION
Filed Oct. 5, 1921
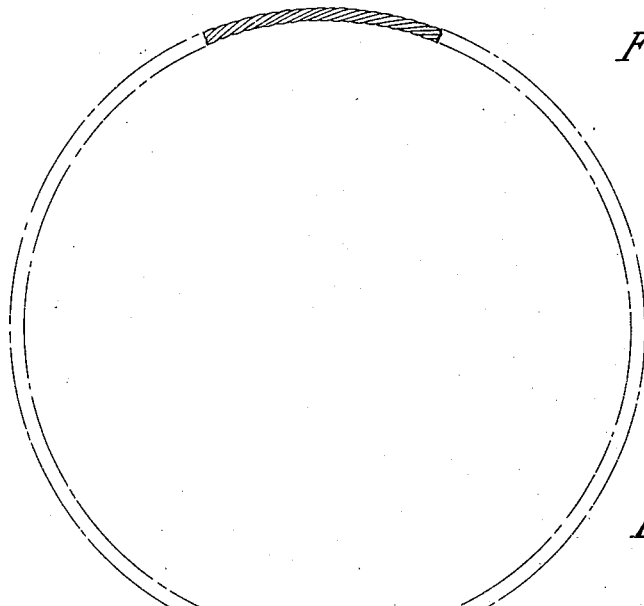
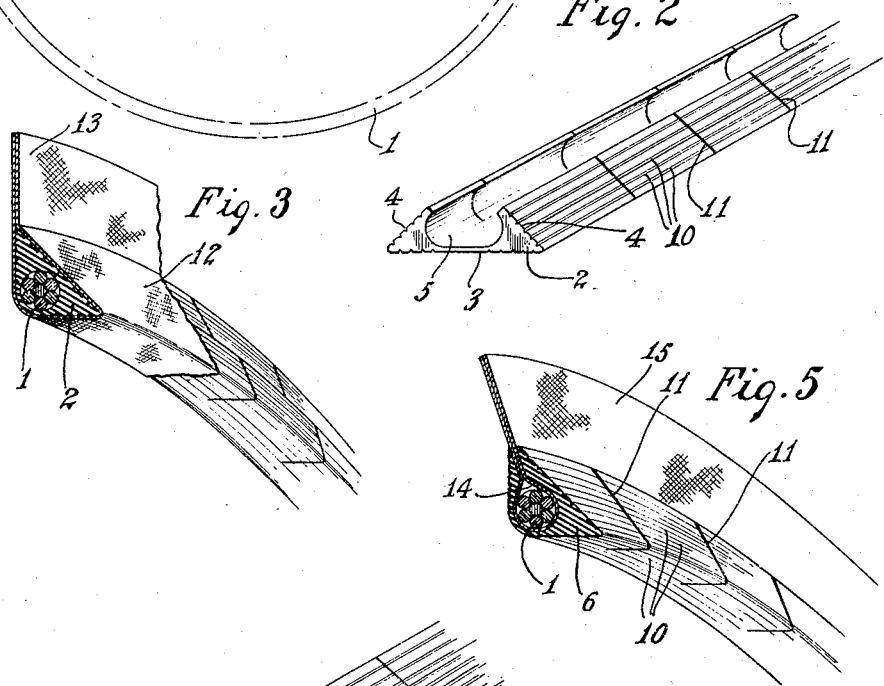
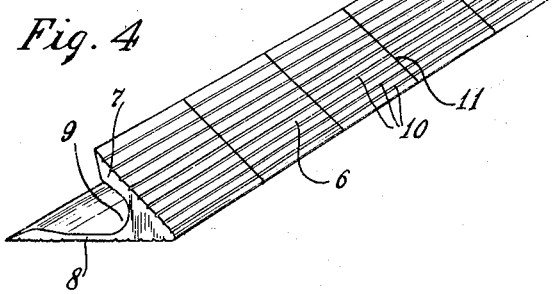
Inventor
Frank H. Beyea
By G. C. Ely
Atty.

Patented Nov. 24, 1925.

1,562,678

UNITED STATES PATENT OFFICE.

FRANK H. BEYEA, OF AKRON, OHIO, ASSIGNOR TO JOHN R. GAMMETER, OF AKRON, OHIO.

TIRE-BEAD CONSTRUCTION.

Application filed October 5, 1921. Serial No. 505,628.

*To all whom it may concern:*

Be it known that I, FRANK H. BEYEA, a citizen of the United States, residing at Akron, in the county of Summit and State of Ohio, have invented certain new and useful Improvements in Tire-Bead Constructions, of which the following is a specification.

This invention relates to the manufacture of beads for pneumatic tires of the inextensible bead or straight-side type, the object of the invention being to improve upon certain features of beads of this type and to remedy defects in the prior bead constructions as will be apparent as the description proceeds.

In the drawings there are shown certain forms of my invention, but it will be understood that other embodiments of the invention may be made without departing from the essential features thereof or sacrificing any of its benefits.

Fig. 1 is a side elevation of the bead wire or cable gromet which forms the base and principal element of the bead;

Fig. 2 is a form of covering or filling means for completing the triangular bead structure;

Fig. 3 is a view showing a bead made up with the filler of Fig. 2;

Fig. 4 is an alternative form of filler; and

Fig. 5 is an alternative form of bead made with the filler of Fig. 4.

The bead structure forming the subject of this invention comprises a wire ring or gromet, preferably an endless cable, and a filler which brings the bead out to the triangular shape. Prior forms of beads have been made from a rubber composition, usually a hard rubber, with or without fibrous filling material, which has been partially cured before being placed in the tire structure. In the case of tires which have been cured while under internal fluid pressure, the composition of the bead has softened at the temperature of vulcanization and the pressure of the fluid in the interior of the tire has frequently caused the toe or lower inner edge of the bead to lose its shape and to round up under the fluid pressure. This is objectionable as it destroys the desirable sharp edge at the interior of the casing. Another objection to the prior type of bead has been that the cable or metallic reinforcement has usually been located at or very close to the edge of the bead and has not been protected from moisture. As a result, rust from the bead wire has penetrated into the layers of the fabric of the tire, which have been rotted at the bead of the tire.

To avoid the above objectionable features, I propose to enclose the bead wire in a casing which will be sufficiently flexible to serve as a material for the bead and will not soften, but retain its shape during vulcanization of the tire. Further, I herein propose to surround the wire cable in the bead with the filler material, so that it will be protected from moisture and no rust from the wire can penetrate to the fabric.

To accomplish the results set forth, I have illustrated two forms of my invention in which 1 is the endless cable ring or gromet forming the center of foundation of the bead. The cable may be of any form, shown herein as a seven strand twisted wire cable which gives the requisite tensile strength to the bead.

In the form of the invention shown in Figs. 2 and 3, the bead filler 2 is made with a flat surface or base 3, having two sloping sides 4 and a centrally disposed trough or groove 5. The bead wire 1 is placed in the trough 5 and the sides of the filler are then brought around until they meet above the bead so that the cable is completely surrounded, and in the invention shown, the bead is completely enclosed at the heel or lower outside edge so that rust will be prevented from penetrating to the fabric of the tire.

In the form of the invention shown in Figs. 4 and 5, the filler 6 is formed with two wings 7 and 8 between which lies the cable groove 9. When the cable is placed within the filler the wing 8 is brought around until it meets the wing 7 and the bead wire is enclosed and protected from rusting.

The bead filler may be made of any suitable material which will be sufficiently strong to hold its shape, will not soften or melt under the heat of vulcanization, and will be flexible enough to withstand the usage to which the tire is subjected as in mounting or demounting from the rim.

In my prior application Serial No. 499,306 filed September 8, 1921, I have proposed the use of a soft metal such as lead as a bead filler in a slightly different shape filler. Lead may also be used for the filler of this invention, or also solder, aluminum, or other sufficiently flexible metallic substance. I may also use fibrous material such as cotton or wood pulp, waste, or other substances that can be molded to retain their shape and furnish a body for the bead, or natural fiber such as rattan, which is particularly suited for the use set forth. The bead filler may be roughened as by a number of parallel grooves 10 so as to enable the covering material to adhere to it and may be provided with a number of spaced transverse slits 11 which render it more flexible.

The usual fabric binding strip, known as the "flipper strip" is applied to the bead. In the form shown in Fig. 3 the "flipper strip" is shown at 12 surrounding the entire outer surface of the bead and provided with the flap or extension 13 as is usual in tire construction. In Fig. 5 the "flipper strip" 14 is shown wrapped around the wire cable within the body of the bead and extending out between the wings 7 and 8 of the filler at the point of the bead to form the flap or extension 15.

The objects and advantages will have become apparent from the description of the invention and no further discussion of them will be necessary. The invention may be practiced in a variety of different forms and different materials from those named may be used.

Claims:

1. In a bead construction, a metallic gromet and a filler strip completely surrounding the gromet, said filler strip being composed of flexible material which will not soften at the temperature of vulcanization.

2. In a bead construction, an endless metallic core, and a filler containing fibrous material, which filler will not soften at the temperature of vulcanization.

3. In a bead construction, an endless cable forming a core, and a filler surrounding the core on all sides, said filler comprising flexible fibrous material which will not soften at the temperature of vulcanization.

4. In a bead construction, a metallic core and a filler of rattan.

5. In a bead construction, an endless wire cable and a filler of rattan wrapped about the bead.

6. In a bead construction, an endless inextensible foundation and a filler, said filler being in the shape of a strip having a central trough for receiving the foundation and having two wings which meet around the foundation to enclose the same on all sides.

7. In a bead construction, an endless cable ring, and a filler to complete the triangular bead, said filler being in the shape of a strip having a central trough for receiving the ring and having two wings which meet around the foundation to enclose the same on all sides.

8. In a bead construction, an endless wire ring, a filler to complete a triangular bead, and a fabric strip within the filler, surrounding the ring and projecting from the upper edge of the bead.

9. In a bead construction, an endless cable, a filler having a central trough to receive the cable and two wings which are wrapped around the cable to enclose the same, and a fabric strip passing between the wings and surrounding the cable.

10. In a bead construction, a triangular body and a centrally located cable, the body of the bead being composed of a single unitary strip wrapped longitudinally about the cable and completely enclosing the same.

11. In a bead construction, a triangular body and a centrally located cable, the body of the bead being composed of a single strip of material which will not soften at the temperature of vulcanization and provided with transverse slits to increase its flexibility.

FRANK H. BEYEA.